United States Patent [19]

Byrne et al.

[11] Patent Number: 5,535,748
[45] Date of Patent: Jul. 16, 1996

[54] REAL-TIME GRAPHICS ON CINE PLAYBACK IN ULTRASOUND IMAGING

[75] Inventors: Kevin G. Byrne; Kelly A. Stonger, both of Waukesha, Wis.

[73] Assignee: General Electric Company, Milwaukee, Wis.

[21] Appl. No.: 344,929

[22] Filed: Nov. 25, 1994

[51] Int. Cl.$^6$ .................................................. A61B 8/00
[52] U.S. Cl. .................... 128/660.07; 358/350
[58] Field of Search ............... 128/660.07; 73/620, 73/621, 625, 626; 358/350, 351; 382/6, 54

[56] References Cited

U.S. PATENT DOCUMENTS

| 4,437,161 | 3/1984 | Anderson | 364/413.23 |
| 5,099,847 | 3/1992 | Powers et al. | 128/660.07 |
| 5,294,993 | 3/1994 | Sable | 358/350 |

*Primary Examiner*—George Manuel
*Attorney, Agent, or Firm*—Dennis M. Flaherty; John H. Pilarski

[57] ABSTRACT

A method and an apparatus for displaying the graphics associated with cine images during cine replay in an ultrasound imaging system. A graphics frame array for storing flagged graphics data is incorporated in the timeline/graphics display memory. Each entry in the graphics frame array has a flag word which indicates whether the graphics data in the identified image frame has changed relative to the graphics data in the preceding image frame. There is one entry in the array for each frame that can be contained in cine memory. During cine capture, any change in graphics sent to the display will also be captured in the graphics frame array for the currently active frame. During cine replay, when a specific cine image frame is on the screen, its corresponding graphics data is taken from the graphics frame array and also sent to the screen. If the flag indicates that other graphics data from the image frame to be replayed is contained in the graphics frame array entry for a preceding frame, the program will travel backwards in the graphics frame array until it finds all graphics data that was present on the screen at the time of cine image capture.

15 Claims, 3 Drawing Sheets

REAL-TIME GRAPHICS ON CINE PLAYBACK IN ULTRASOUND IMAGING

FIELD OF THE INVENTION

This invention generally relates to ultrasound imaging of human tissue and blood. In particular, the invention relates to means for re-displaying previously displayed image data in an ultrasound imaging system.

BACKGROUND OF THE INVENTION

Measurement of blood flow in the heart and vessels using the Doppler effect is well known. Whereas the amplitude of the reflected waves is employed to produce black and white images of the tissues, the frequency shift of the reflected waves may be used to measure the velocity of reflecting scatterers from tissue or blood. Color flow images are produced by superimposing a color image of the velocity of moving material, such as blood, over the black and white anatomical image. The measured velocity of flow at each pixel determines its color. The process by which by which black and white images are formed is conventionally referred to as B-mode imaging, while the process by which flow velocity is imaged using colors is conventionally referred to as color flow imaging.

The present invention is incorporated in an ultra-sound imaging system consisting of four main subsystems: a beamformer 2 (see FIG. 1), processors 4, a scan converter/display controller 6 and a master controller 8. System control is centered in the master controller 8, which accepts operator inputs through an operator interface (not shown) and in turn controls the various subsystems. The master controller also generates the system timing and control signals which are distributed via a system control bus 10 and a scan control bus (not shown).

The main data path begins with the analog RF inputs to the beamformer from the transducer. The beamformer outputs two summed digital baseband receive beams. The baseband data is input to the processors 4, where it is processed according to the acquisition mode and output as processed acoustic vector (beam) data to the scan converter/display processor 6. The scan converter/display processor 6 accepts the processed acoustic data and outputs the video display signals for the image in a raster scan format to a color monitor 12. The scan converter/display controller 6, in cooperation with master controller 8, also formats multiple images for display, display annotation, graphics overlays and replay of cine loops and recorded timeline data.

The B/M processor converts the baseband data from the beamformer into a log-compressed version of the signal envelope. The B function images the time-varying amplitude of the envelope of the signal as a grey scale. The envelope of a baseband signal is the magnitude of the vector which the baseband data represent. The phase angle is not used in the B/M display.

The frequency of sound waves reflecting from the inside of blood vessels, heart cavities, etc. is shifted in proportion to the velocity of the blood cells: positively shifted for cells moving towards the transducer and negatively for those moving away. The Doppler processor computes the power spectrum of these frequency shifts for visual display and it also synthesizes an audio signal from the separated positive and negative shifts.

The color flow (CF) processor is used to provide a real-time two-dimensional image of blood velocity in the imaging plane. The blood velocity is calculated by measuring the phase shift from firing to firing at a specific range gate. Instead of measuring the Doppler spectrum at one range gate in the image, mean blood velocity from multiple vector positions and multiple range gates along each vector are calculated, and a two-dimensional image is made from this information.

The acoustic line memory 14 of the scan converter/display controller 6 accepts processed digital data from the processors 4. The scan converter 16 performs the coordinate transformation of the color flow and B mode data from polar coordinate (R–θ) sector format or Cartesian coordinate linear array to appropriately scaled Cartesian coordinate display pixel data stored in X–Y display memory 18. The X–Y display memory 18 provides storage for up to three X–Y image frames.

The M mode and Doppler data types are interpolated in both dimensions (range and time for M or frequency and time for Doppler) by the timeline processor incorporated in the timeline/graphics processor and display memory board 20. The graphics data for producing graphics overlays on the displayed image is also generated and stored on the timeline/graphics board 20. The video processor 22 displays the resulting image in a raster scan format on video monitor 12.

Timeline displays provide a representation of the vector data acquired along a particular scan line multiple times over time. In contrast, the X–Y image frame data is derived from the vector data acquired along multiple scan lines. The rate at which new vector data is obtained along a particular scan line is greater than the acoustic frame rate in the ultrasound imaging system shown in FIG. 1.

For B mode images, the acoustic line memory 14 acquires and stores the baseband data in a polar or Cartesian vector format from the B/M processor. The scan converter 16 generates addresses used to map the information into a pixel value at a given X–Y coordinate for display. The mapping function utilizes a two-dimensional interpolation. The acoustic line memory 14 performs the same function for color flow images.

For M mode images, the timeline/graphics board 20 acquires, interpolates and stores the M mode pixel values for raster display and review in a moving bar format. For Doppler data, the timeline/graphics board 20 acquires Doppler spectra data and overlay data. The Doppler spectra data is interpolated and stored as pixel values for raster display and review. The overlay data is interpolated in time and converted to overlay graphic data for raster display.

During timeline vector acquisition, an update bar appears at the left side of the display and begins to move to the right at a previously commanded sweep speed. Live imagery appears to the left of the moving bar and remains stationary. Any previously displayed recorded image to the right of the moving bar is erased as the bar covers it.

The video processor 22 multiplexes between the graphics data, image data, and timeline data to generate the final video output. Additionally it provides for various greyscale and color maps as well as combining the greyscale and color images.

The cine board 24 provides resident digital image storage for single image review and multiple image loop review and various control functions. The region of interest displayed during single-image cine replay is that used during the image's acquisition. The cine memory also acts as a buffer for transfer of images to digital archival devices via the master controller 8.

Ultrasound images, which are produced at a rate of 30 frames per second for a 60-Hz system, are captured as X–Y data in cine memory. Graphics data (in RGB format) may be associated with each image frame on the display, but it is not captured in cine memory along with the image. The graphics data associated with each frame (such as time, the color flow region of interest, and Doppler and M cursors) can change from frame to frame.

The timeline/graphics board 20 also provides a review of previously acquired timeline vector data. The timeline replay is presented as a scrolling display, with the entire review portion of memory 20 appearing as one continuous strip. The operator controls the scroll with a trackball, rolling the trackball to the right to scroll the display to the right to display the timeline data recorded earlier in time, until the end of the timeline replay memory is reached.

FIG. 2 shows a series of image frames as their associated Doppler cursor sweeps across the image from left to right. The image data stored in cine memory will contain image frame 0 through image frame 30, but it will not contain the graphics data Doppler cursor. During cine replay, current ultrasound implementations use one of two methods to display graphics.

FIG. 3 shows the cine replay of the data captured in FIG. 2 in accordance with a first conventional method. Since the graphics data is not captured with the image data, the graphics associated with the last captured cine frame is left on the display during the entire cine replay. In the example shown in FIG. 3, the Doppler cursor graphic associated with image frame 30 (the last captured cine frame, see FIG. 1) remains on the screen.

In accordance with a second conventional method, any change to an image graphic (such as the color flow region of interest, or the Doppler and M cursor) will result in a cine dump (i.e., the contents of the cine memory are flushed or cleared). This method ensures that the graphics always match the image data. This method is often viewed as restrictive by users.

SUMMARY OF THE INVENTION

The present invention is a method for displaying some of the graphics associated with cine images during cine replay in an ultrasound imaging system. Graphics data (such as time, the color flow region of interest, and Doppler and M cursors) that is needed for the proper interpretation of the associated image frame is captured and displayed on a frame by frame basis. Cine dumps due to a graphic reposition are minimized.

In accordance with the preferred embodiment of the invention, a graphics frame array for storing graphics data is incorporated in the timeline/graphics display memory of the ultrasound imaging system. Each entry in the graphics frame array has a data pointer and a flag word which indicates whether the graphics data in the associated image frame has changed relative to the graphics data in the preceding image frame. If the graphics data has changed, then the entry will further include the new graphics data. Each entry contains sufficient capacity to store the graphics data for each one of a plurality of graphics, e.g., a time graphic, a region of interest graphic and a Doppler cursor, in the event that all of the graphics change from one image frame to the next. There is one entry in the array for each image frame that can be contained in cine memory. The cine graphics frame memory 26 is used as a circular buffer, which is true for the cine image replay memory 30 as well.

A Frame Interrupt exists that will increment a counter that is used as the current active frame index into the graphics frame array. Thus, during cine capture, any change in graphics sent to the display will also be captured in the graphics frame array for the currently active frame.

In accordance with the present invention, the flag word information will be used to accurately display the captured graphics data upon cine replay. During cine replay, when a specific cine image frame is on the screen, its corresponding graphics data is taken from the graphics frame array and also sent to the screen. The flag word is then checked to see if additional graphics data is on the screen, but not specifically captured in the graphics frame array entry for this frame. If the flag indicates that other graphics data from the image frame to be replayed is contained in the graphics frame array entry for a previous frame, the program will travel backwards in the graphics frame array until it finds all graphics data that was present on the screen at the time of cine image capture.

DETAILED DESCRIPTION OF THE PREFERRED EMBODIMENTS

Figure 5:
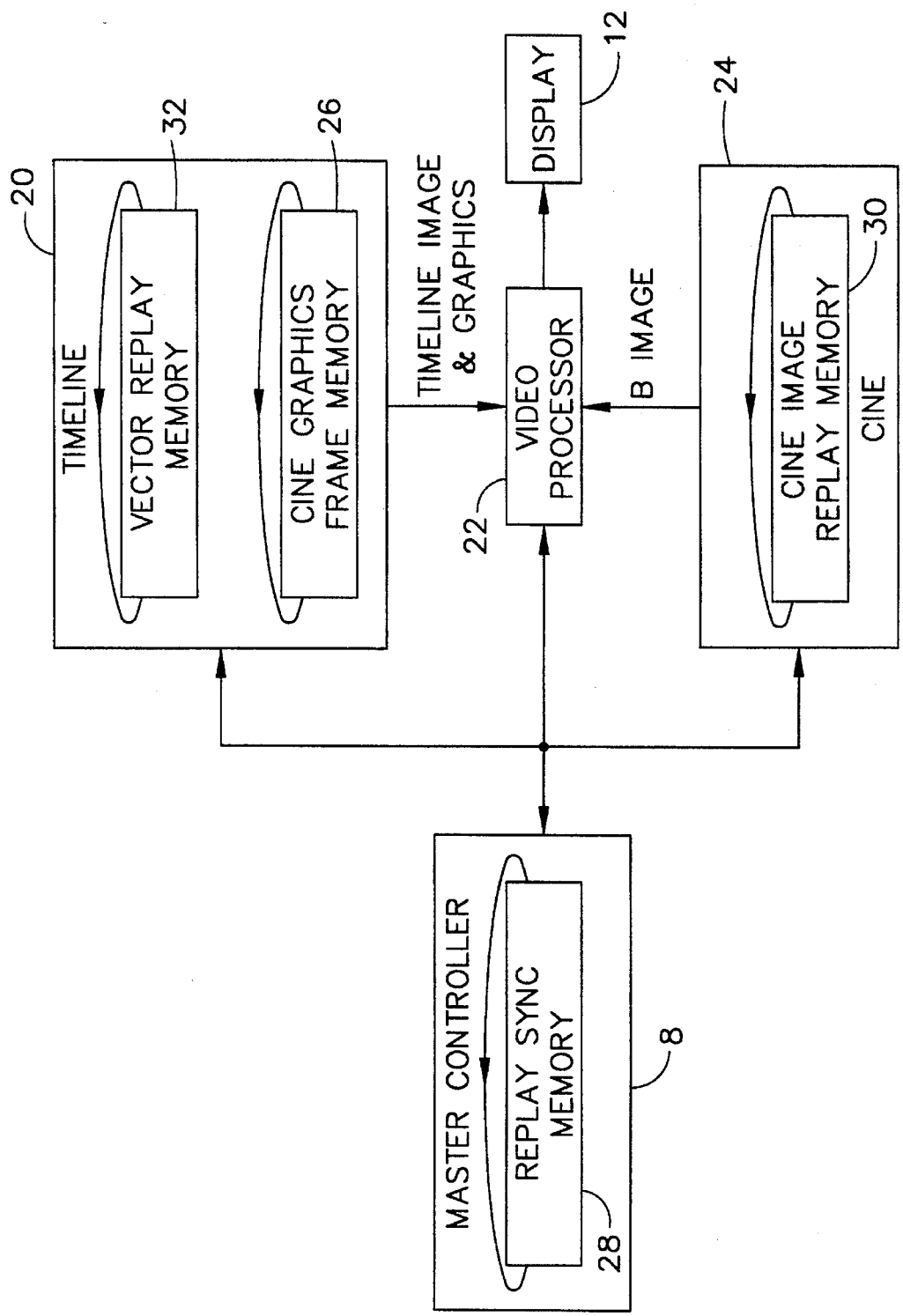
FIG. 5 is a block diagram of the apparatus for providing real-time graphics during cine playback of images in accordance with the preferred embodiment of the invention.

In accordance with the invention, the display controller is improved by incorporating means for providing real-time graphics during cine playback of ultrasound images. A cine graphics frame memory 26 is incorporated on the timeline/graphics board 20 and a cine image replay memory 30 is incorporated on the cine board 24, as shown in FIG. 5. The cine graphics frame memory 26 captures and replays graphics data associated with each cine image frame captured by the cine image replay memory 30. At the same time, a replay synchronization buffer 28 located in master controller 8 is used to synchronize the replay of associated timeline vector data captured by a vector replay memory 32 on timeline/graphics board 20 with the replay of each cine image frame captured by the cine image replay memory 30.

Figure 1:
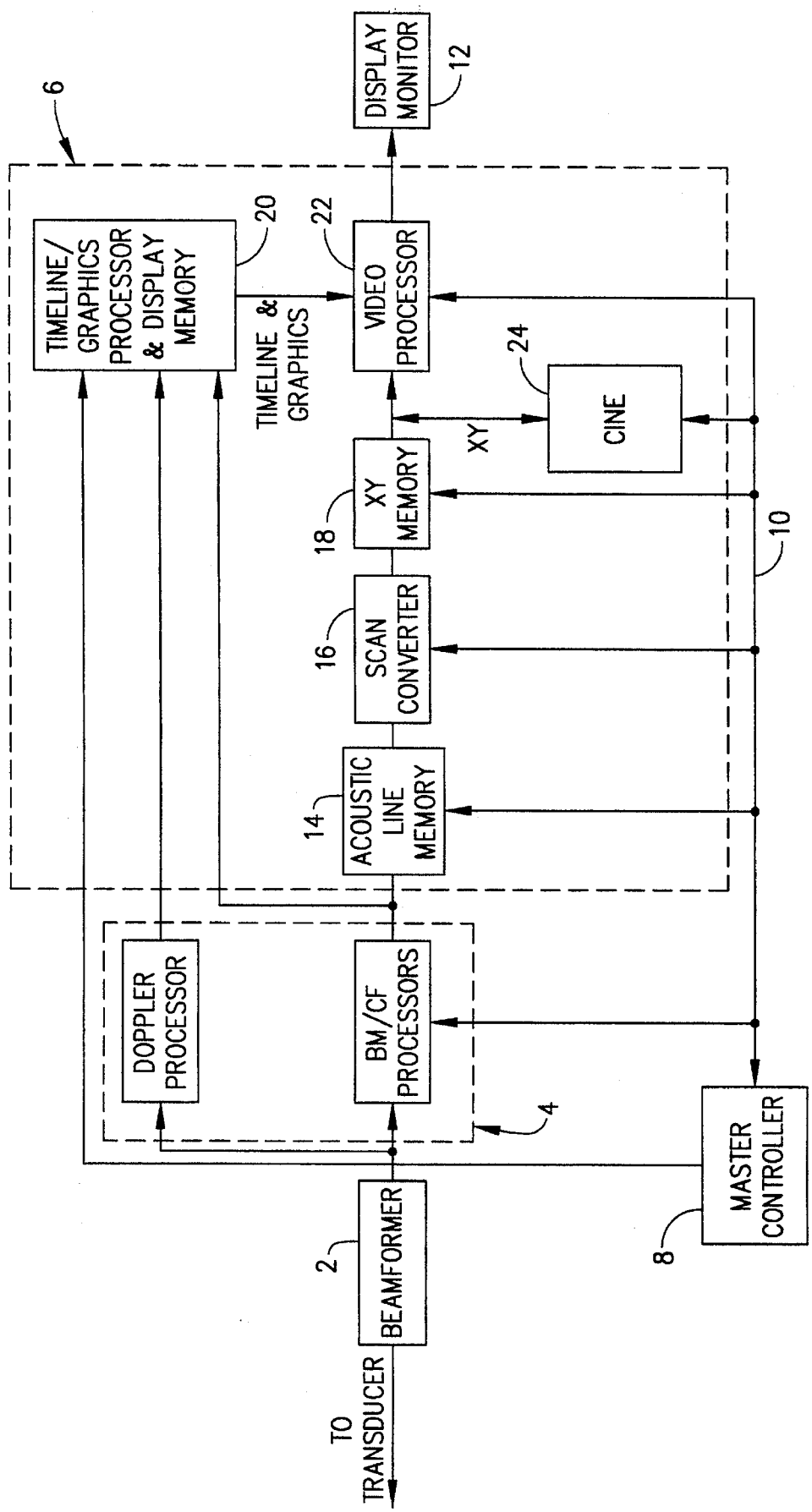
FIG. 1 is a block diagram showing the major functional blocks of a real-time ultrasound imaging system.
Figure 4:
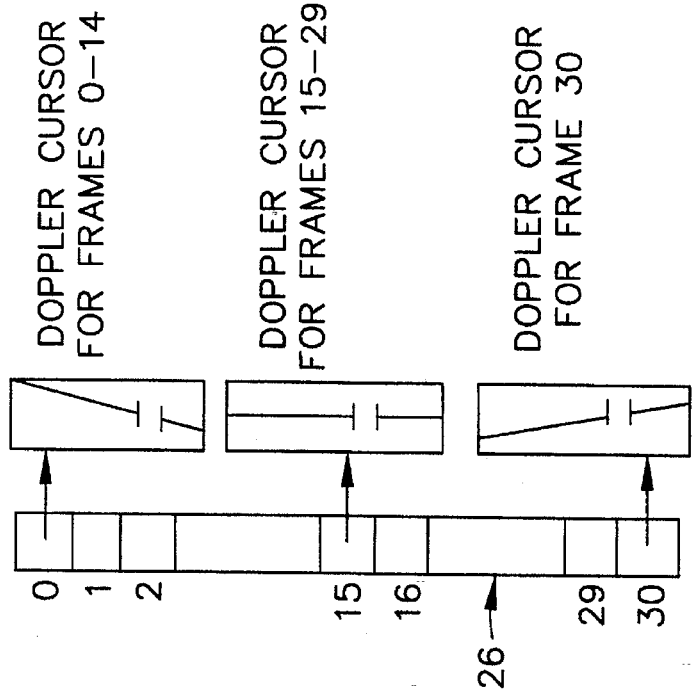
FIG. 4 is a schematic diagram showing the data structure of the graphics frame array in accordance with the preferred embodiment of the invention.
Figure 2:
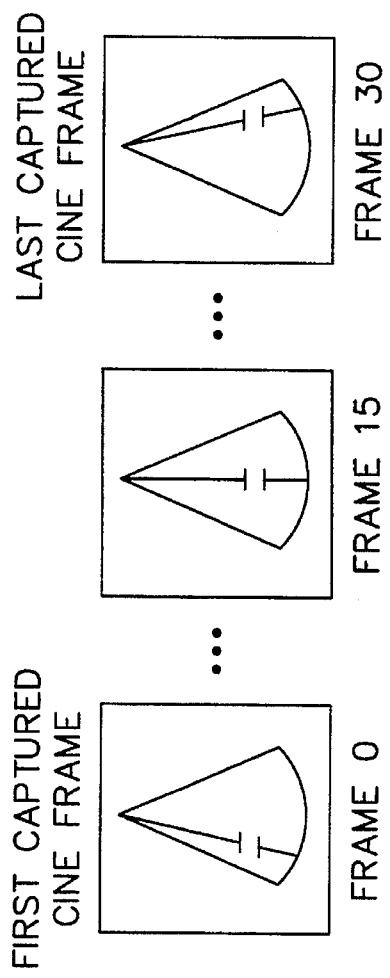
FIG. 2 is a diagram showing the display of a series of image frames as a cursor sweeps across the image from left to right.
Figure 3:
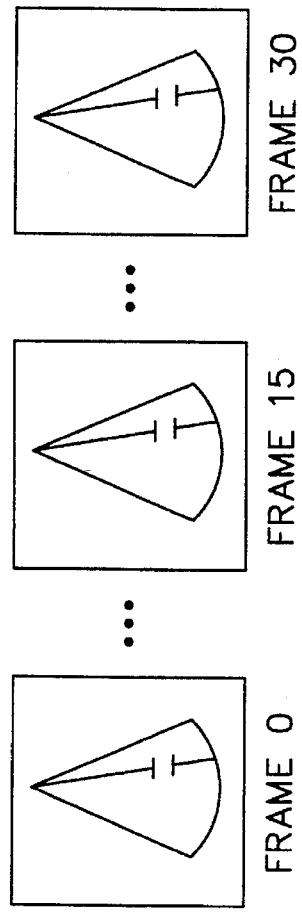
FIG. 3 is a diagram showing the cine replay of the series of image frames shown in FIG. 2 in accordance with a conventional replay format.

In accordance with the preferred embodiment of the present invention, the structure of the graphics data stored in cine graphics frame memory 26 is as shown in FIG. 4. Each entry in the graphics frame array has a pointer identifying the respective image frame and a flag word which indicates whether the graphics data in the identified image frame has changed relative to the graphics data in the preceding image frame. If the graphics data has changed, then the entry will further include the new graphics data. There is one entry in the array for each frame that can be contained in cine memory. The cine graphics frame memory 26 is used as a circular buffer, which is true for the cine image replay memory 30 as well.

A Frame Interrupt exists that will increment a counter that is used as the current active frame index into the graphics frame array. During cine capture, any change in graphics sent to the display will also be captured in the graphics frame array for the currently active frame. In the example shown in FIG. 4, the Doppler cursor graphic associated with image frame 0 is captured in the graphics frame array. Since the cursor did not change position from frame 1 through frame 14, no graphics data is added for those frames in the graphics frame array. The flag words of entries 1 through 14 are marked to indicate that a Doppler cursor is on the screen for those image frames, but has not changed position from the previous frame. The flag word information will be used to accurately display the captured graphics data upon cine replay. The Doppler cursor has moved in frame 15, so its graphics data will be captured in the graphics frame array, as will that of frame 30 where the Doppler cursor has again moved.

During cine replay, when a specific cine image frame is on the screen, its corresponding graphics data is taken from the graphics frame array and also sent to the screen. As an example, to replay the graphics of cine frame 30, the program will access the graphics frame array entry at position 30. If there is graphics data in that entry, it will be sent to the screen. The flag word will then be checked to see if additional graphics data is on the screen, but not specifically captured in the entry of this frame. This can happen if a Doppler cursor and a color flow region of interest are both on the screen, but only the Doppler cursor has moved. In this case, the actual graphic data is contained in a previous frame, so the program will travel backwards in the graphics frame array until it finds all graphics data that was present on the screen at the time of cine image capture.

The advantage of this method over the previous methods is that the image (and graphics) seen by the operator during cine review is the same as it was during cine capture. In addition, the need to do a cine dump for minor graphics changes is eliminated.

The foregoing preferred embodiment has been disclosed for the purpose of illustration. Variations and modifications will be readily apparent to those skilled in the art of ultrasonic imaging systems. All such variations and modifications are intended to be encompassed by the claims set forth hereinafter.

We claim:

1. An ultrasound imaging system comprising:

means for transmitting ultrasound beams along a multiplicity of scan lines;

means for transducing received echoes from said ultrasound beams, wherein said transducing means form acoustic image data in response to echoes from said ultrasound beams;

means for scan converting said acoustic image data into pixel data;

X–Y display memory means connected to said scan converting means for storing pixel data;

graphics display memory means for storing graphics data;

video processor means connected to said X–Y display memory means and said graphics display memory means for receiving pixel data of an image frame from said X–Y display memory means and graphics data of said image frame from said graphics display memory means and multiplexing said pixel data with said graphics data;

display means connected to said video processor means for displaying said image frame;

cine memory means connected to store the pixel data of said displayed image frame; and playback control means for reconstructing the displayed image frame in a cine playback mode at a later time by retrieving the pixel data of said displayed image frame from said cine memory means and retrieving the graphics data of said displayed image frame from said graphics display memory means.

2. The ultrasound imaging system as defined in claim 1, wherein said cine memory means comprises a circular cine image replay buffer and said graphics display memory means comprises a circular cine graphics frame buffer.

3. The ultrasound imaging system as defined in claim 1, wherein said graphics display memory means stores a graphics frame array having a data structure comprising one entry for each image frame displayed, each entry comprising a flag word which indicates whether the graphics data in the corresponding image frame has changed relative to the graphics data in a preceding image frame.

4. The ultrasound imaging system as defined in claim 3, wherein for each entry having a flag word indicating graphics data in the corresponding image frame has changed relative to the graphics data in a preceding image frame, said entry further comprising said changed graphics data.

5. The ultrasound imaging system as defined in claim 4, further comprising means for retrieving changed graphics data of an entry in said graphics frame array corresponding to a first image frame being replayed and means for retrieving unchanged graphics data of an entry in said graphics frame array corresponding to a second image frame acquired prior to said first image frame, said retrieved changed and unchanged graphics data being displayed concurrently during replay of said first image frame.

6. An image display system comprising:

X–Y display memory means for storing pixel data;

graphics display memory means for storing graphics data;

video processor means connected to said X–Y display memory means and said graphics display memory means for receiving pixel data of an image frame from said X–Y display memory means and graphics data of said image frame from said graphics display memory means and multiplexing said pixel data with said graphics data;

display means connected to said video processor means for displaying said image frame;

cine memory means connected to store the pixel data of said displayed image frame; and playback control means for reconstructing the displayed image frame in a cine playback mode at a later time by retrieving the pixel data of said displayed image frame from said cine memory means and retrieving the graphics data of said displayed image frame from said graphics display memory means.

7. The image display system as defined in claim 6, wherein said cine memory means comprises a circular cine image replay buffer and said graphics display memory means comprises a circular cine graphics frame buffer.

8. The image display system as defined in claim 6, wherein said graphics display memory means stores a graphics frame array having a data structure comprising one entry for each image frame displayed, each entry comprising a flag word which indicates whether the graphics data in the corresponding image frame has changed relative to the graphics data in a preceding image frame.

9. The image display system as defined in claim 8, wherein for each entry having a flag word indicating graphics data in the corresponding image frame has changed relative to the graphics data in a preceding image frame, said entry further comprising said changed graphics data.

10. The image display system as defined in claim 9, further comprising means for retrieving changed graphics data of an entry in said graphics frame array corresponding to a first image frame being replayed and means for retrieving unchanged graphics data of an entry in said graphics frame array corresponding to a second image frame acquired prior to said first image frame, said retrieved changed and unchanged graphics data being displayed concurrently during replay of said first image frame.

11. A method for replaying images displayed by an image display system, comprising the steps of:

storing the pixel data for each image frame after that image frame has been displayed;

storing that portion of the graphics data in each image frame which has changed relative to the graphics data in the respective preceding image frame displayed;

retrieving stored pixel data belonging to an image frame to be replayed;

retrieving stored graphics data belonging to said image frame to be replayed; and displaying said retrieved pixel data and graphics data concurrently, whereby said image frame is replayed.

12. The method as defined in claim 11, further comprising the step of storing a flag word indicating that certain graphics in one image frame have not changed relative to the graphics in a preceding image frame.

13. The method as defined in claim 11, wherein said step of storing changed graphics data for each image frame comprising providing a data array in memory, said data array comprising a respective entry for each image frame for which pixel data has been stored, each entry including at least the changed graphics data for each respective image frame.

14. The method as defined in claim 13, further comprising the step of storing as part of each entry in said data array a flag word indicating whether certain graphics in one image frame have not changed relative to the graphics in a preceding image frame.

15. The method as defined in claim 14, wherein said step of retrieving stored graphics data belonging to said image frame to be replayed involves retrieving any changed graphics data from the data array entry corresponding to said image frame to be replayed and retrieving any unchanged graphics data from those data array entries indicated by the flag word in the data array entry corresponding to said image frame to be replayed and the flag words in those data array entries corresponding to image frames acquired before said image frame to be replayed was acquired.

* * * * *